(12) United States Patent
Mickle et al.

(10) Patent No.: US 7,873,981 B2
(45) Date of Patent: *Jan. 18, 2011

(54) METHODS, SYSTEMS AND COMPUTER PROGRAM PRODUCTS FOR PROVIDING INTERNET PROTOCOL TELEVISION SET UP

(75) Inventors: Jacklyn A. Mickle, Decatur, GA (US); Michael W. Smith, Dacula, GA (US); James Chilton, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 666 days.

This patent is subject to a terminal disclaimer.

(21) Appl. No.: 11/320,885

(22) Filed: Dec. 28, 2005

(65) Prior Publication Data

US 2007/0162928 A1    Jul. 12, 2007

(51) Int. Cl.
*H04N 7/16* (2006.01)
*H04N 7/173* (2006.01)

(52) U.S. Cl. .................. 725/132; 725/118; 725/86; 725/114

(58) Field of Classification Search .......... 725/105, 725/109, 110, 111, 113, 114, 115, 116, 117, 725/118, 119

See application file for complete search history.

(56) References Cited

U.S. PATENT DOCUMENTS

| 7,522,904 | B1 | 4/2009 | Zhu |
| 2002/0012347 | A1* | 1/2002 | Fitzpatrick .................. 370/392 |
| 2003/0204562 | A1* | 10/2003 | Hwang ........................ 709/203 |
| 2004/0093370 | A1* | 5/2004 | Blair et al. .................. 709/200 |
| 2004/0153712 | A1* | 8/2004 | Owhadi et al. .................. 714/4 |
| 2005/0021766 | A1* | 1/2005 | McKeowen et al. ......... 709/228 |
| 2005/0183130 | A1* | 8/2005 | Sadja et al. .................. 725/107 |
| 2005/0262540 | A1 | 11/2005 | Swix et al. |
| 2006/0227714 | A1 | 10/2006 | Griffin et al. |
| 2007/0041554 | A1 | 2/2007 | Newman et al. |
| 2007/0074258 | A1 | 3/2007 | Wood et al. |
| 2007/0088827 | A1 | 4/2007 | Starbuck et al. |
| 2007/0112939 | A1 | 5/2007 | Wilson et al. |
| 2007/0115860 | A1 | 5/2007 | Samele et al. |

* cited by examiner

*Primary Examiner*—Brian Ensey
*Assistant Examiner*—Sunita Joshi
(74) *Attorney, Agent, or Firm*—Cantor Colburn LLP

(57) ABSTRACT

A method of providing set up services to customer premise equipment (CPE), the CPE coupled to an internet protocol television (IPTV) network. The method includes operating a network element as a set up terminal server, the network element being part of a communications network. A request to initiate a set up process is received from the CPE. A set up server coupled to the communications network is accessed to initiate a set up application. The set up server communicates with the CPE through the network element to perform installation of the CPE and provisioning of the CPE.

16 Claims, 6 Drawing Sheets

| STB ID | OS VERSION | GUID | PHONE NUMBER | HARD DRIVE | MEMORY REMAIN | USER NAME | |
|---|---|---|---|---|---|---|---|
| xx8902746 | 4.1 | 123.4.5.89 | 123-456-7890 | 100G | 80G | Mr. Smith | |
| | | | | | | | |
| | | | | | | | |

FIGURE 3

Customer Name [ ]    Phone number [ ]

STB ID [ ]

STB GUID [ ]

OS VERSION [ ]

Phone number [ ]

METHODS, SYSTEMS AND COMPUTER PROGRAM PRODUCTS FOR PROVIDING INTERNET PROTOCOL TELEVISION SET UP

BACKGROUND

The present disclosure relates generally to internet protocol television (IPTV), and more particularly, to methods, systems, and computer program products for providing IPTV support.

Currently, IPTV services are provided to users through IPTV networks and in-home devices, such as set top boxes (STBs). When a user experiences difficulty in receiving the IPTV services, the existing process is for the user to call a customer service representative to seek assistance. The customer service representative can often respond to routine issues, but may have difficulty responding to more complex issues. This often results in the IPTV service provider sending a technician to the user's location to diagnose and resolve the issue. Unfortunately, the task of sending technicians to a user's location is costly and time consuming for both the service provider and the user.

There is a need in the art for methods and systems to facilitate diagnosis and resolution of IPTV service issues without requiring sending a technician to visit the user.

SUMMARY

Embodiments include a method of providing set up services to customer premise equipment (CPE), the CPE coupled to an internet protocol television (IPTV) network. The method includes operating a network element as a set up terminal server, the network element being part of a communications network. A request to initiate a set up process is received from the CPE. A set up server coupled to the communications network is accessed to initiate a set up application. The set up server communicates with the CPE through the network element to perform installation of the CPE and provisioning of the CPE. Embodiments further include a computer program product for implementing the method.

Additional embodiments include customer premise equipment (CPE), the CPE coupled to an internet protocol television (IPTV) network. The CPE includes a network interface establishing communications between the CPE and the IPTV network. A processor executes an IPTV client for receiving IPTV services. The processor executes a diagnostic API for transmitting CPE status information indicating the status of the CPE to a network element in the IPTV network. The processor generates a request for set up and receives information to perform installation of the CPE and provisioning of the CPE.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES:

FIG. 3 depicts contents of a database in exemplary embodiments;

FIG. 4 depicts a template in exemplary embodiments;

The detailed description explains the preferred embodiments of the invention, together with advantages and features, by way of example with reference to the drawings.

DETAILED DESCRIPTION OF EXEMPLARY EMBODIMENTS

Figure 1:
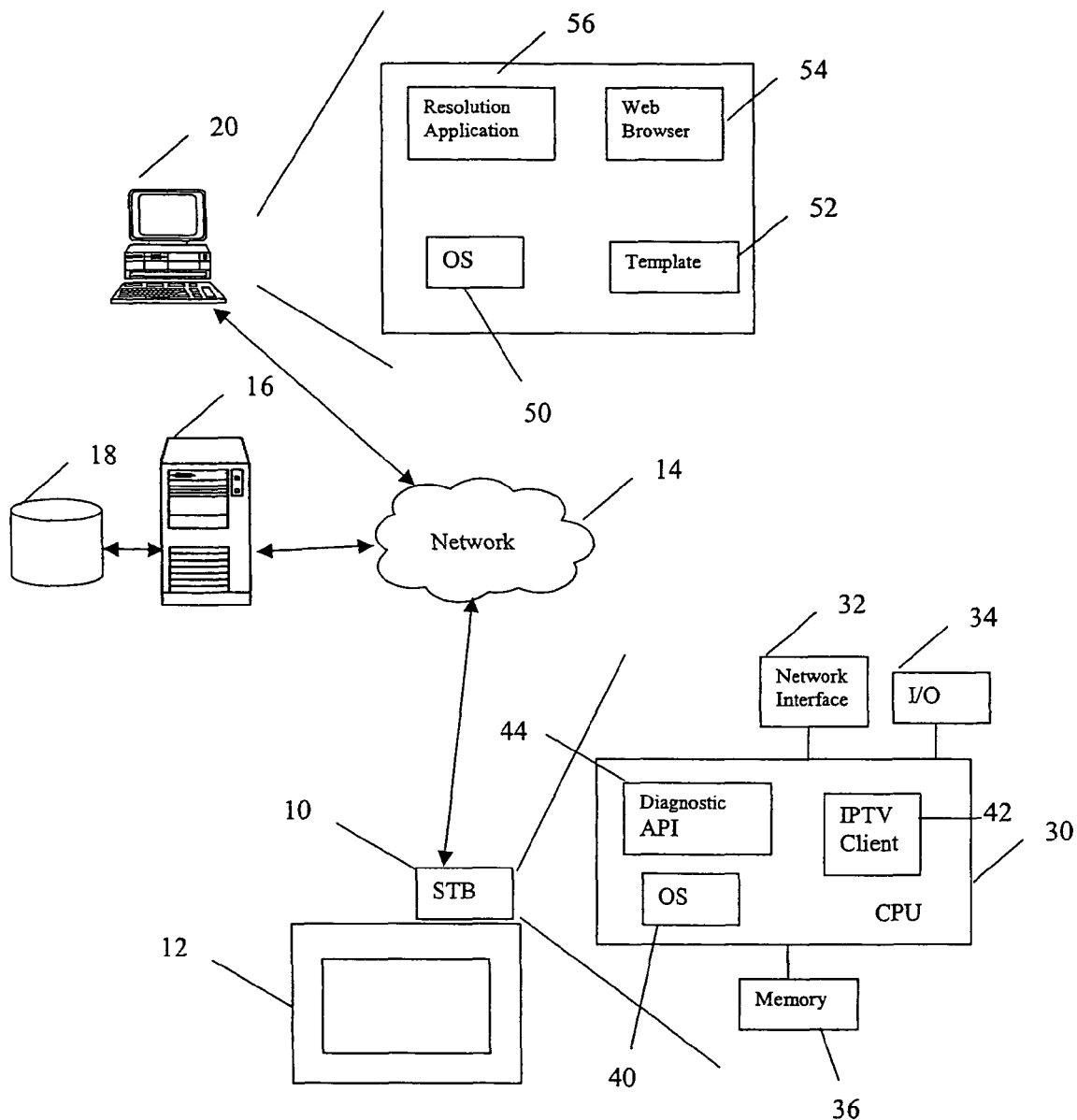
FIG. 1 depicts a system for providing IPTV diagnostics in exemplary embodiments.

FIG. 1 depicts a system for providing IPTV diagnostic services in exemplary embodiments. The system includes one or more set top boxes (STB) 10 coupled to one or more displays 12, e.g., a television. Alternatively, an STB 10 may be integrated with the display 12 in the same device. The STB is one example of customer premise equipment (CPE) that may interface with an IPTV network. Exemplary CPE includes STBs, mobile devices, voice over internet protocol (VoIP) devices, televisions with integrated equipment, etc.

The STB 10 receives IPTV services such as broadcast video, broadcast audio, video on demand, etc. from various sources (not shown). The STB 10 communicates with an IPTV network 14. The network 14 may be implemented using a variety of networks and network components including, but not limited to, digital subscriber line (DSL), public switched telephone network (PSTN), cable networks, Internet, cellular, WiFi (IEEE 802.11), WiMax (IEEE 802.16), satellite, etc. According to one embodiment, IPTV services may be provided using a software platform, such as the Microsoft TV IPTV Edition running on network elements in network 14. In exemplary embodiments, network 14 is a telecommunications network providing broadband services over a DSL connection to the STB. As embodiments are directed at IPTV diagnostics, details of the IPTV services are not described herein.

The STB 10 communicates with a database server 16 over network 14. The database server 16 may be implemented using known servers to execute computer programs to perform the processes described herein. The database server 16 collects STB information from the STB 10. A database 18 stores the STB information from the STB 10 as described in further detail herein. The database 18 may be a separate device from database server 16 or memory within database server 16.

A diagnostic system 20 is also in communication with the network 14. The diagnostic system 20 may be implemented using a general-purpose computer executing a computer program to carry out the processes described herein. The diagnostic system 20 may be operated by personnel of an entity providing the IPTV services to STB 10. In exemplary embodiments, the user of STB 10 contacts customer service personnel operating diagnostic system 20 to obtain diagnostic assistance.

According to an exemplary embodiment, the STB 10 includes a processor 30, a network interface 32, an input/output device 34 and memory 36. The input output device 34 provides a mechanism for a user to interact with the STB 10. For example, the input/output device 34 may receive commands from a user's remote control. Alternatively, the input/output device 34 may be implemented using technologies including, but not limited to, touch screens, voice recognition, wired/wireless peripherals (keyboard, mouse, joystick, trackball), personal digital assistants (PDAs), wireless phones, etc. Further, the input/output device 34 may communicate directly with other, non-human devices such as servers and/or computers for configuring the STB. The network interface 32 provides the communication interface with network 14. The network interface 32 may be implemented using existing communication devices such as a DSL modem, cable modem, etc. Processor 30 may be a general-purpose microprocessor executing a computer program for executing the processes described herein. The processor 30 may access memory (e.g., RAM) containing a computer program for execution.

Memory 36 is used for storing a variety of information. Memory 36 may store STB information such as serial number of the STB 10, ID of the STB (e.g., an addressable ID, such as a globally unique identifier or GUID), configuration information such as software information and hardware information. Additional features of the STB information are provided herein. The memory 36 also stores content, such as recorded broadcast television and may include memory that serves as a digital video recorder (DVR). The DVR memory may be implemented using a variety of non-volatile memory devices including, but not limited to, hard drives, flash memory, optical storage devices, solid state memory, etc., used alone or in combination.

The processor 30 executes software applications including an operating system 40 (e.g. Microsoft CE), an IPTV client 42 and a diagnostic application program interface (API) 44. The operating system 40 provides the software environment for execution of the other programs. The IPTV client is responsible for reception of IPTV services such as broadcast television, video-on-demand (VOD), news, radio broadcasts, etc. Existing IPTV clients may be used in the STB 10.

The diagnostic API 44 collects STB information in real time and sends the diagnostic information to the database server regularly. The diagnostic API 44 may send diagnostic information at predetermined intervals (e.g., every N minutes) or may send diagnostic information upon the detection of a change (e.g., upon upgrading operating system or detecting new hardware). As described in further detail herein, the database server 16 receives the diagnostic information and stores it in database 18 for use by diagnostic system 20.

The diagnostic system 20 may be operated by personnel (e.g., customer service representative) of an entity providing the IPTV services to STB 10. The diagnostic system 20 executes software applications 50, 52, 54 and 56 as described herein. The diagnostic system 20 executes an operating system 50 (e.g., Microsoft Windows) that provides the software environment for executing other applications. A web browser 54 is used to access database server 16. Database server 16 executes a web server application that permits access to database 18 via a web interface.

A data template 52 on the diagnostic system 20 provides data search and retrieval functions. The template 52 serves as a tool for retrieving data from the database 18 in an orderly format, easily presented to the customer service representative operating diagnostic system 20.

The resolution application 56 operates to facilitate diagnosis of issues experienced by the STB and the user of the STB. The resolution application 56 processes data from the database 18 to determine how to resolve issues at the STB. The resolution may include operations performed by the STB and/or by the user of the STB as described in further detail herein.

Figure 2:
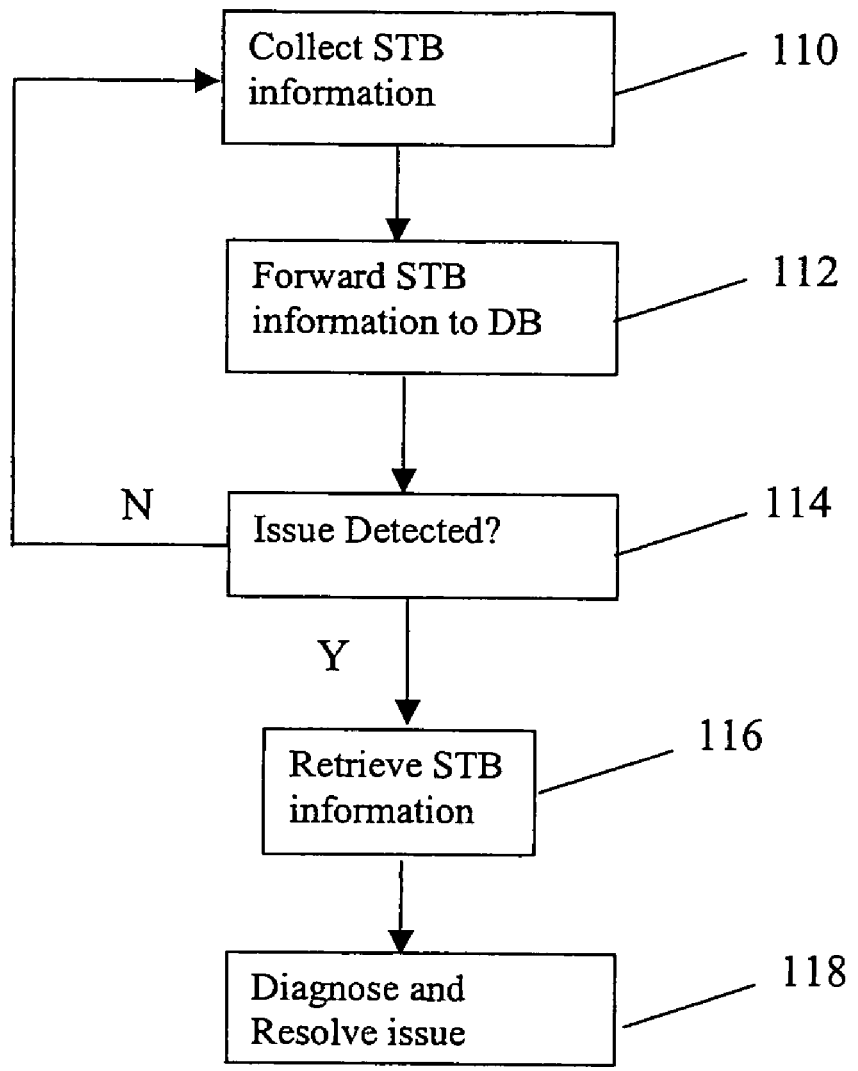
FIG. 2 depicts a method of providing IPTV diagnostics in exemplary embodiments.

FIG. 2 is a flow chart of processing implemented in exemplary embodiments. In operation, the diagnostic system 20 executes a resolution application 56 to address issues occurring at the STB 10. The resolution application 56 accesses data in database 18 to diagnose these issues. The process begins at step 110 where the diagnostic API 44 collects STB information. The STB information may include a variety of data related to the STB 10. The STB information may include STB identification data such as STB serial number, STB GUID, phone number associated with the STB user, address of the location of the STB, user name, etc. The STB information also includes STB operational data such as the current channel the STB is tuned to, current menu the STB is accessing, whether content is currently being stored to memory 36, etc. The STB information may include STB software data such as boot read only memory (ROM) version, operating system (OS) version, and IPTV client version. STB information may also include communication parameters such as basic DSL related diagnostic information, sync rate, port statistics, assigned IP address to the DSL modem router or static IP address, etc. Other STB information includes resource data such as available physical memory, available virtual memory, allocated physical memory, allocated managed memory, whether a hard drive is present (e.g., DVR), total hard disk space, dynamic host configuration protocol (DHCP) lease time remaining, default gateway, media access control (MAC) address, video type, etc.

The diagnostic API 44 collects the STB information and sends the STB information to database 18 as shown at step 112. Information may be collected by the API 44 in real time or at regular intervals. FIG. 3 illustrates exemplary content of the database 18. As shown, the database 18 includes records having numerous fields for each STB, including data forwarded by the diagnostic API 44. It is understood that numerous fields are not depicted in FIG. 3 and the fields shown are exemplary. The STB information collected by the API 44 may be stored and periodically sent to database 18 at regular intervals. Alternatively, the STB information may be sent in real time. For example, the diagnostics API 44 may routinely (every N minutes) monitor information on the STB and send the STB information to the database 18. Alternatively, certain data may be sent once and then updated when a change is detected in the STB. For example, the OS 40 of the STB 10 is not expected to change frequently. Thus, the diagnostic API 44 can forward information regarding the OS 40 initially and then not send additional OS information until an update in the OS is detected. This reduces the amount of information sent to the database 18. Other STB information, such as the channel currently being viewed or the menu function being accessed by the user, may be sent to the database 18 in real time or in regular intervals. Thus, the database 18 includes a combination of historic information and more current, e.g., real time, information to diagnose STB issues.

According to an exemplary embodiment, the transmission of STB information to the database 18 continues until an issue is detected as shown at step 114. An issue may be detected in a number of ways. For example, a user of the STB 10 may report the issue by phone, e-mail or live chat to the operator of the diagnostic system 20. For example, the user may call a customer care number to report an issue with viewing and recording of a program (e.g., tiling). Alternatively, the resolution application 56 may run an analysis routine on data in database 18 to detect trends that indicate an issue is present or likely. For example, the resolution application 56 may examine data in the database 18 to detect STBs having hard drives that are almost completely full. Such a condition can negatively effect operation of the STB. Thus, these STBs would be flagged as having an issue by the resolution application 56.

If an issue is raised, flow proceeds to step 116 where the data corresponding to the STB experiencing the issue is retrieved. This step may be performed by diagnostic personnel using the template 52 as shown in FIG. 4. The template 52 includes a number of entries corresponding to fields in the database 18. If a user calls the service center, for example, caller identification is used to retrieve the user's phone number using existing caller identification mechanisms. The phone number is then used to retrieve the STB information for that user by accessing database 18 using the phone number to index a record associated with the caller. If the issue is automatically detected by the resolution application 56, the data corresponding to the STB is retrieved and may be presented in the template 52 to customer service personnel at diagnostic system 20.

At step 118, the issue experienced at the STB 10 is diagnosed and resolved. This diagnosis may be automatically derived by the resolution application 56. For example, the resolution application 56 may automatically detect that the memory 36 on the STB 10 is almost completely full, thereby flagging an issue. The resolution application 56 may then resolve the issue by sending a message to the STB, which may be presented to the user's display, that content needs to be deleted from memory 36 to improve operation.

Alternatively, the user and the customer service representative may discuss the issue (phone, live chat, etc.) and determine a resolution. For example, the customer service representative may evaluate the STB information and suggest certain actions be taken by the user (e.g., alter system set-up) or may initiate corrective measures (e.g., initiate an update of STB software). The resolution application 56 includes diagnostic tools to identify issues that may not be readily apparent to the customer service personnel. For example, the resolution application 56 may recognize outdated software versions on the STB, incorrect communication settings on the STB, etc. There are many other conditions the application can test/detect such as provisioning of the STB based on bill plan (e.g., customer is paying for VOD, but doesn't have access to a VOD server). Other conditions include detecting if throughput rates for video packets upstream and downstream are within threshold limits. Further, line noise and jitter may be detected. Thus, the customer service representative using the diagnostic system 20 may accomplish more effective issue resolution.

Figure 5:
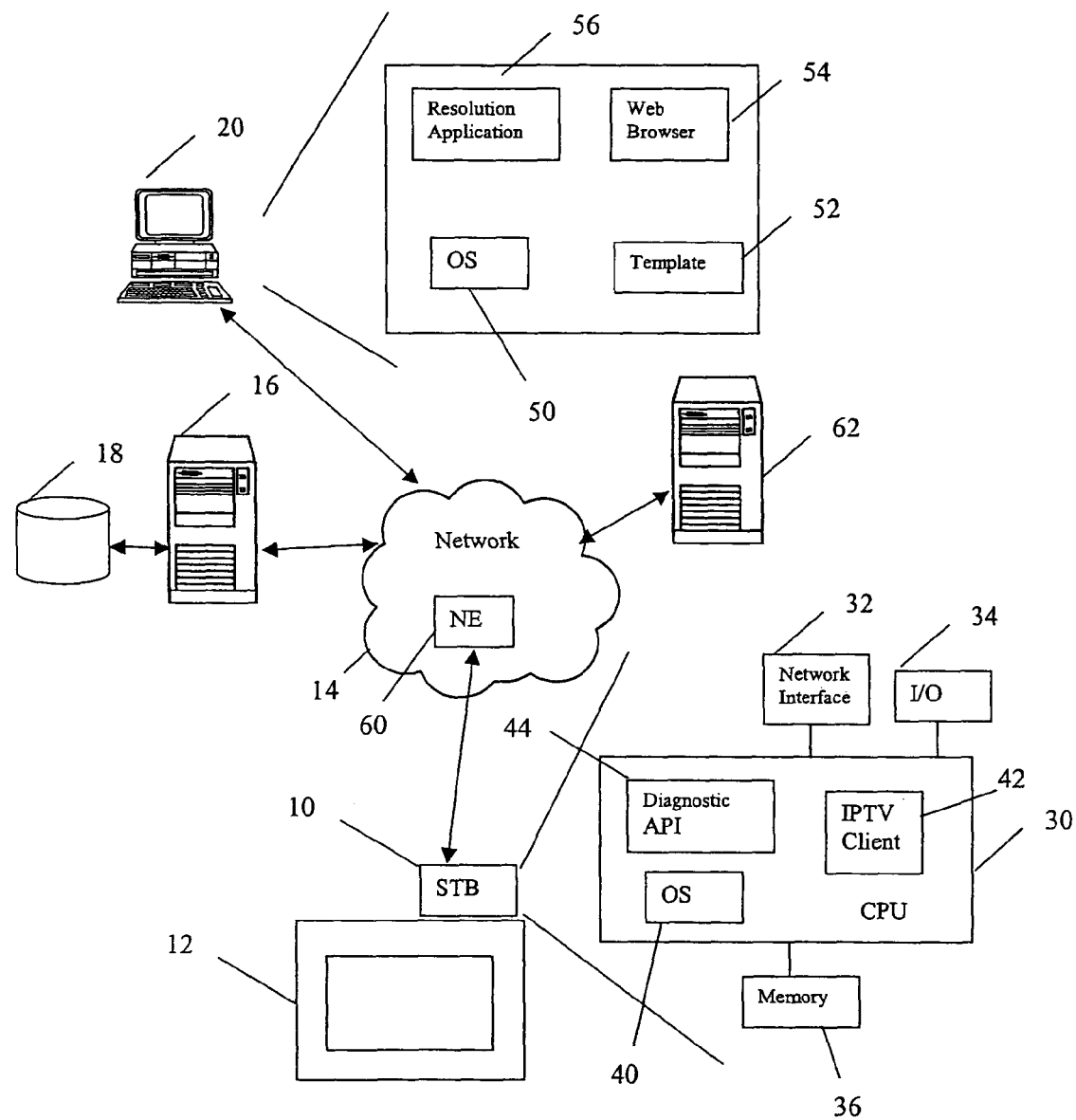
FIG. 5 depicts a system for providing IPTV set up services in exemplary embodiments.

FIG. 5 depicts exemplary system architecture in embodiments that facilitate set up of the STB 10. The set up processes include, for example, connecting the STB to the IPTV network, installing software in the STB for the first time and provisioning a connection with the network 14. According to exemplary embodiments, the set up process is highly automated so that the user of the STB is not burdened with technical aspects of connecting the STB 10 to the network 14. Further, a technician is not needed at the user's site to perform the set up, thus saving expense for the service provider making the set up process more convenient for the user.

According to an exemplary embodiment, the network 14 includes a network element 60 that operates as a set up terminal server for a client set up application in the STB 10. The network element 60 includes a processor (e.g., one or more microprocessors) and executes a computer program to perform the functions described herein. The network element 60 may be a device located at a customer's central office (CO) or in other components of the communications network 14.

In exemplary embodiments, the STB 10 executes a thin client, such that the network element 60 performs substantially all the processing needed for the STB 10 to perform the set up process. Exemplary thin client applications include remote desktop protocol (RDP) clients from Microsoft, ICA clients from Citrix, Java clients, etc.

In exemplary embodiments, the network element 60 operates as a set up terminal server to set up (e.g., install and provision) the STB 10. The network element 60 operates in conjunction with a set up server 62 coupled to network 14. The set up server 62 executes a set up application described in further detail herein. The set up network element 60 interfaces with the STB 10 and executes the majority of the client side processing, to reduce processing burden and software installation on the STB 10.

Figure 6:
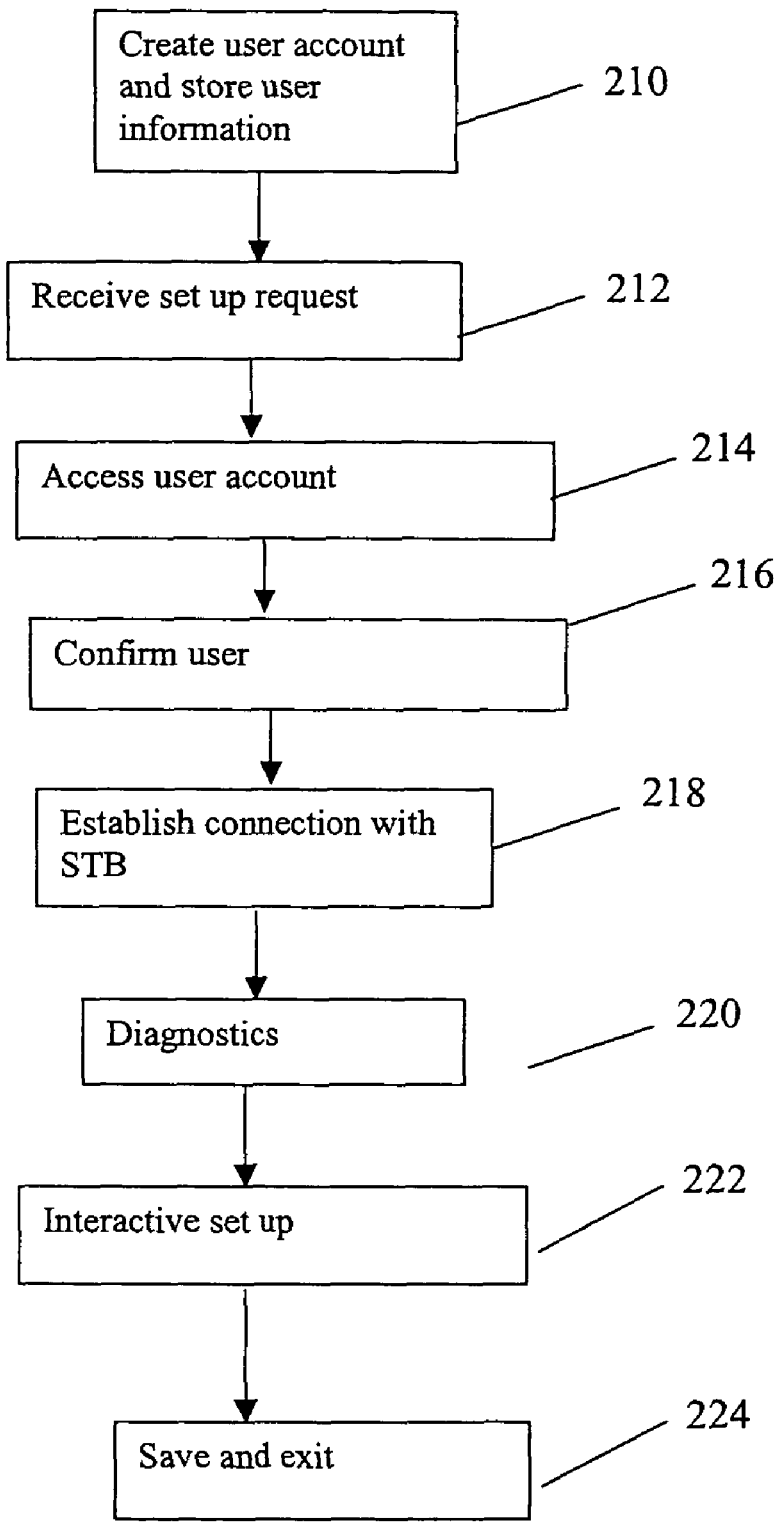
FIG. 6 is a flow chart of a process for providing IPTV set up in exemplary embodiments.

FIG. 6 is a flowchart of a process for performing STB set up in exemplary embodiments. The process begins at step 210 where a user establishes a user IPTV account. This may be performed when the user subscribes to the IPTV service and may be performed in conjunction with purchasing a STB 10. The user information is collected (e.g., name, address, account number) and the GUID of the STB is also obtained. This user information and STB information is stored on set up server 62.

At step 212, a set up request is received at the set up server. According to an exemplary embodiment, the set up request is generated when the user connects the STB 10 to the network (e.g., through DSL) and powers the STB 10. Upon initial powering, the STB transmits a request for set up to the network element 60, which transmits the set up request to the set up server 62. The set up request includes the GUID of the STB.

At step 214, the set up server 62 uses the GUID to access the user information and STB information in the user account. The user is confirmed at step 216, which involves determining that user's account is properly paid, that IPTV service is available, etc. Once the user is confirmed, a connection is established between the IPTV network 14 and the STB 10 at step 218. This may involve provisioning the STB 10 with an IP address of an ITPV server in the network 14. The STB 10 can then access IPTV services through the designated server.

Once a connection is established between the STB 10 with the IPTV network 14, diagnostic testing may be performed by the set up server 62 at step 220. The diagnostic testing may involve testing various communication parameters of the STB (e.g., bandwidth, latency). Diagnostic testing may also include testing the STB response to network messages.

When the diagnostic testing is completed, an interactive set up routine is launched as shown at step 222. This phase of the set up process involves walking the user through a set up process requiring some user involvement. The set up server 62 provides prompts to the user through the STB 10 and television 12. The interactive set up process may query the user to confirm certain account data. The user may need to enter household information, designate a name for the STB, etc. Further, the set up process may query the user to confirm that the user can view certain menus or screens, hear audio, etc. The set up server 62 can use default responses if there is no response from the user. For example, the default response may be that the user can see video and hear audio. The interactive set up serves a confirmation of basic system operation and access to IPTV services. Once the interactive set up is completed, information from the set up process is stored on set up server 62 at step 224.

According to exemplary embodiments, the set up process automates the installation and provisioning of an STB and reduces (or eliminates) the need for a technician to set up a STB at a user site. This reduces expense for the service provider and the user and provides for a more convenient set up process for the user.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium and loaded into and/or executed by a computer, or transmitted over some transmission medium and loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of providing set up services to customer premise equipment (CPE), the CPE coupled to an internet protocol television (IPTV) network, the method comprising:
   storing user information on a set up server in response to the user purchasing the CPE;
   operating a network element as a set up terminal server, the network element being part of a communications network;
   receiving from the CPE a request to initiate a set up process, the request from a thin client application on the CPE, the network element executing client side processing for the CPE, the request generated in response to applying power to the CPE;
   accessing the set up server separate from the network element coupled to the communications network to initiate a set up application, the set up server confirming that the user account is paid prior to initiating a connection between the CPE and the IPTV network;
   wherein the set up server communicates with the CPE through the network element to perform installation of the CPE and provisioning of the CPE; and
   receiving CPE status information indicating the status of the CPE to the network element in the IPTV network for diagnostic analysis;
   wherein the CPE status information includes first status information received periodically at regular intervals and second status information sent upon a change in the CPE.

2. The method of claim 1 wherein:
the CPE has a GUID, the set up server determining that the GUID corresponds to a user account prior to installation of the CPE.

3. The method of claim 1 wherein:
the set up server provisions a connection between the CPE and the IPTV network.

4. The method of claim 3 wherein:
the set up server provisions the connection by providing the CPE with an IP address of an IPTV server.

5. The method of claim 1 wherein:
the set up server performs diagnostics on the CPE.

6. The method of claim 5 wherein:
the diagnostics include testing bandwidth at the CPE.

7. The method of claim 1 wherein:
the set up server executes an interactive set up process with the CPE.

8. The method of claim 7 wherein:
the interactive set up process generates queries for a user of the CPE.

9. A computer program product for providing set up services to customer premise equipment (CPE) coupled to a television, the CPE coupled to an internet protocol television (IPTV) network, the computer program product comprising:
   a storage medium readable by a processing circuit and storing instructions for execution by the processing circuit for facilitating a method comprising:
   storing user information on a set up server in response to the user purchasing the CPE;
   operating a network element as a set up terminal server, the network element being part of a communications network;
   receiving from the CPE a request to initiate a set up process, the request from a thin client application on the CPE, the network element executing client side processing for the CPR the request generated in response to applying power to the CPE;
   accessing the set up server separate from the network element coupled to the communications network to initiate a set up application, the set up server confirming that the user account is paid prior to initiating a connection between the CPE and the IPTV network;
   wherein the set up server communicates with the CPE through the network element to perform installation of the CPE and provisioning of the CPE; and
   receiving CPE status information indicating the status of the CPE to the network element in the IPTV network for diagnostic analysis;
   wherein the CPE status information includes first status information received periodically at regular intervals and second status information sent upon a change in the CPE.

10. The computer program product of claim 9 wherein:
the CPE has a GUID, the set up server determining that the GUID corresponds to a user account prior to installation of the CPE.

11. The computer program product of claim 9 wherein:
the set up server provisions a connection between the CPE and the IPTV network.

12. The computer program product of claim 11 wherein:
the set up server provisions the connection by providing the CPE with an IP address of an IPTV server.

13. The computer program product of claim 9 wherein:
the set up server performs diagnostics on the CPE.

14. The computer program product of claim 13 wherein:
the diagnostics include testing bandwidth at the CPE.

15. The computer program product of claim 9 wherein:
the set up server executes an interactive set up process with the CPE.

16. The computer program product of claim 15 wherein:
the interactive set up process generates queries for a user of the CPE.

* * * * *